United States Patent
Sato et al.

(10) Patent No.: US 8,269,089 B2
(45) Date of Patent: Sep. 18, 2012

(54) BEARING STRUCTURE FOR DRUM PEDAL

(75) Inventors: Naoki Sato, Nagoya (JP); Shinji Noguchi, Nagoya (JP)

(73) Assignee: Hoshino Gakki Co., Ltd., Aichi (JP)

( * ) Notice: Subject to any disclaimer, the term of this patent is extended or adjusted under 35 U.S.C. 154(b) by 0 days.

(21) Appl. No.: 12/870,848

(22) Filed: Aug. 30, 2010

(65) Prior Publication Data

US 2012/0000344 A1 Jan. 5, 2012

(30) Foreign Application Priority Data

Jul. 1, 2010 (JP) ................................. 2010-151122

(51) Int. Cl.
*G10D 13/02* (2006.01)
(52) U.S. Cl. ...................................... 84/422.1
(58) Field of Classification Search .................. 84/422.1
See application file for complete search history.

(56) References Cited

U.S. PATENT DOCUMENTS

| | | | | |
|---|---|---|---|---|
| 5,204,485 A * | 4/1993 | Lombardi | ...................... | 84/422.1 |
| 5,365,824 A * | 11/1994 | Hoshino | ...................... | 84/422.1 |
| 5,388,494 A * | 2/1995 | Hoshino | ...................... | 84/422.1 |
| 5,421,234 A * | 6/1995 | Liao | ............................. | 84/422.1 |
| 5,567,899 A * | 10/1996 | Hoshino | ...................... | 84/422.1 |
| 5,994,635 A * | 11/1999 | Hoshino | ...................... | 84/422.1 |
| 6,011,207 A * | 1/2000 | Hoshino | ...................... | 84/422.1 |
| 6,028,259 A * | 2/2000 | Lombardi et al. | ........... | 84/422.1 |
| 6,137,040 A | 10/2000 | Hoshino | | |
| 6,188,007 B1 * | 2/2001 | Liao | ............................. | 84/422.3 |
| 6,259,012 B1 * | 7/2001 | Hoshino | ...................... | 84/422.1 |
| 6,504,088 B1 * | 1/2003 | Hsieh | ........................... | 84/422.1 |
| 6,538,184 B2 * | 3/2003 | Hsieh | ........................... | 84/422.1 |
| 6,590,147 B2 * | 7/2003 | Kassabian | .................... | 84/422.1 |
| 6,596,934 B2 * | 7/2003 | Hsieh | ........................... | 84/422.1 |
| 7,351,901 B2 * | 4/2008 | Hsieh | ........................... | 84/422.1 |
| 7,368,650 B2 * | 5/2008 | Hsieh | ........................... | 84/422.1 |
| 7,754,953 B2 * | 7/2010 | Takegawa | .................... | 84/422.1 |
| 7,868,236 B1 * | 1/2011 | Lai | ............................... | 84/422.1 |
| 7,989,688 B2 * | 8/2011 | Luo | .............................. | 84/422.1 |
| 2005/0155482 A1 * | 7/2005 | Takegawa | .................... | 84/422.1 |
| 2007/0297860 A1 | 12/2007 | Hsieh | | |
| 2008/0173159 A1 | 7/2008 | Chen | | |
| 2012/0000344 A1 * | 1/2012 | Sato et al. | .................... | 84/422.1 |

FOREIGN PATENT DOCUMENTS

| | | |
|---|---|---|
| JP | 59-007494 U | 1/1984 |
| JP | 60-098896 U | 7/1985 |

* cited by examiner

*Primary Examiner* — David Warren
*Assistant Examiner* — Robert W Horn (57) ABSTRACT

A drum pedal includes a base having a pair of posts, a shaft, a beater, a footboard, and a chain belt. A shaft is rotatably supported by the upper ends of the posts with bearings. One of the bearings is fixed to a first end portion of the shaft by fastening a screw to the shaft along the axial direction. The bearing fixed to the shaft is sandwiched by the cover and the post along the axial direction of the shaft.

9 Claims, 9 Drawing Sheets

BEARING STRUCTURE FOR DRUM PEDAL

BACKGROUND OF THE INVENTION

The present invention relates to a bearing structure for a drum pedal used for playing a drum such as a bass drum.

A drum pedal includes a base, a footboard, a shaft, a beater, and a chain belt. Force pressing down the footboard of a drum pedal is transmitted to the shaft through the chain belt, so that the beater is rotated with the shaft and strikes the drum. The drum pedal therefore includes a bearing structure having roller bearings or slide bearings that rotatably support the shaft. Known bearing structures for drum pedals include those disclosed in Patent Documents 1 and 2.

Figure 9:
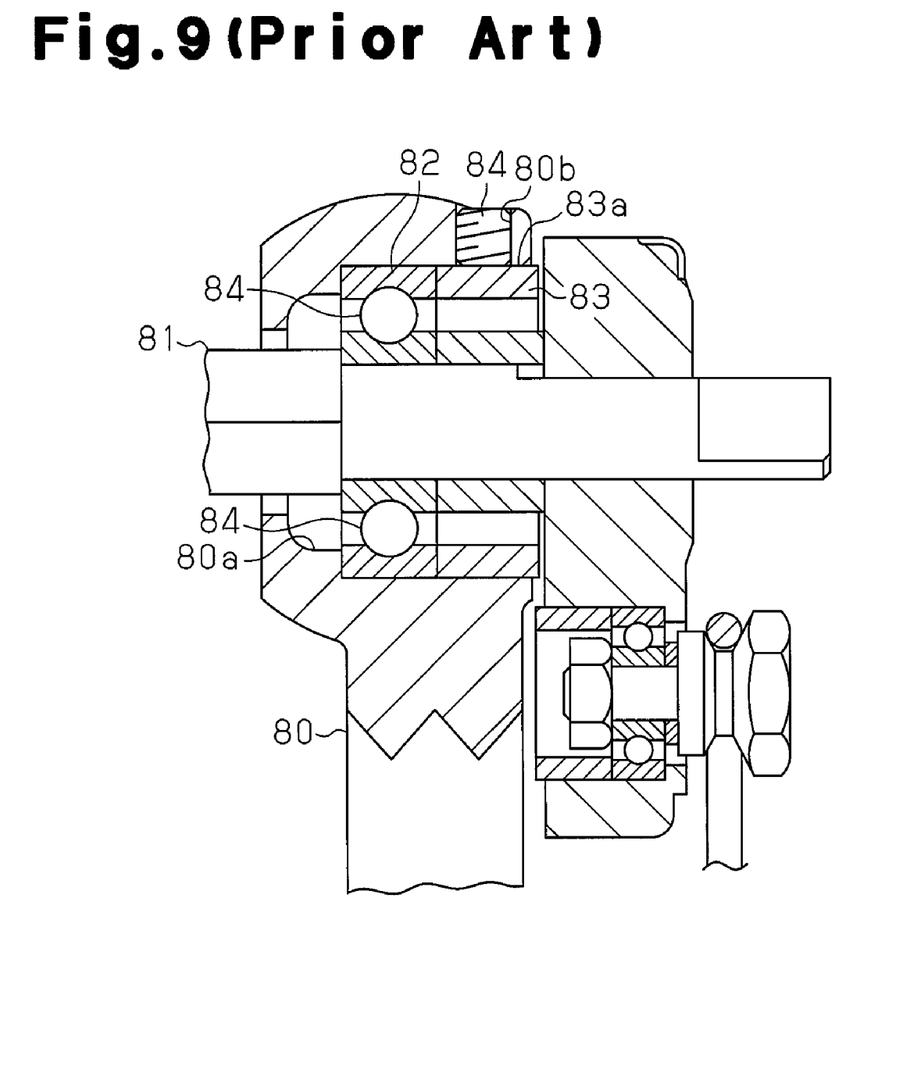
FIG. 9 is a partial cross-sectional view illustrating a conventional bearing structure.

The bearing structure disclosed in U.S. Pat. No. 5,388,494 includes posts 80, one of which is shown in FIG. 9. A horizontal hole 80a extending along the axis of a shaft 81 is formed in an upper end of the post 80. A threaded hole 80b is formed in the upper end of the post 80. The threaded hole 80b extends perpendicularly to the axis of the shaft 81 and communicates with the horizontal hole 80a. An end of the shaft 81 is received in the horizontal hole 80a of the post 80, together with a ball bearing 82 and a collar 83.

Figure 10:
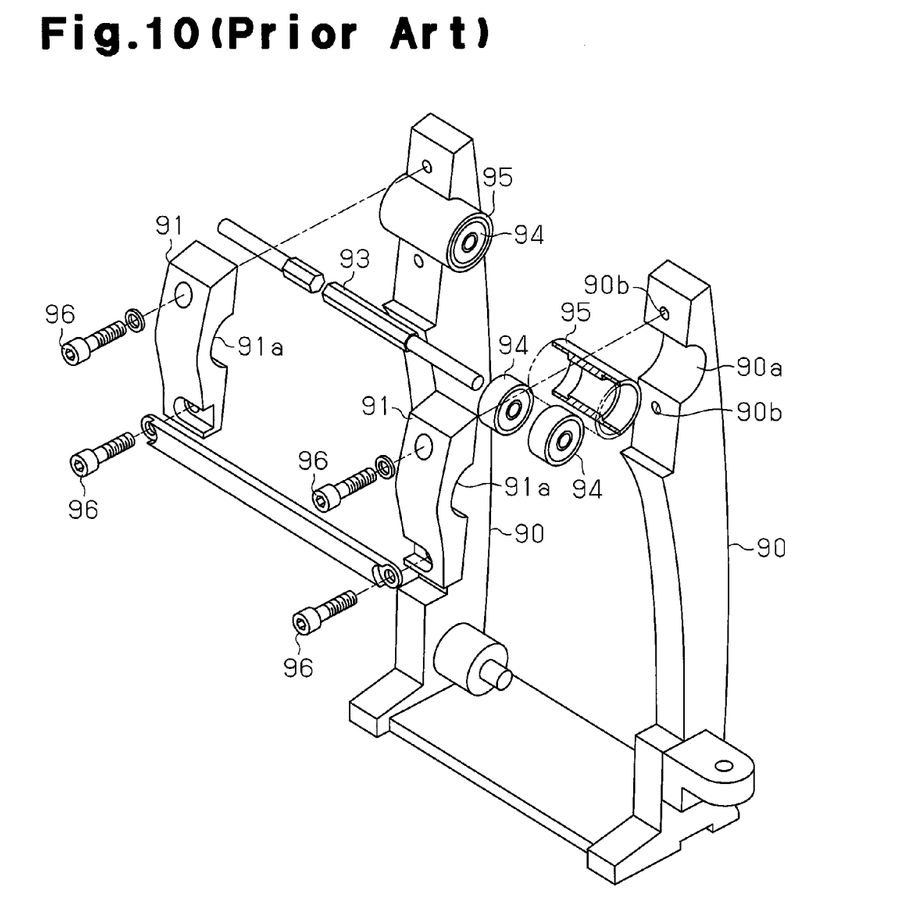
FIG. 10 is a partial cross-sectional view illustrating a conventional bearing structure.

According to the bearing structure disclosed in U.S. Pat. No. 6,504,088, a recess 90a having a semicircular cross section is formed in the upper end of each post 90 as shown in FIG. 10. In the upper portion of each post 90, threaded holes 90b are formed above and below the recess 90a. A cap 91 having a recess 91a is attached to the upper portion of each post 90. The recess 91a has a semicircular cross section. The recess 90a of each post 90 and the recess 91a of the associated cap 91 form a horizontal hole having a circular cross section. Each end of a shaft 93 is received by the horizontal holes with a pair of bearings 94 and a cylindrical barrel 95.

In the case of the bearing structure disclosed in U.S. Pat. No. 5,388,494, a screw 84 is threaded into the threaded hole 80b of the post 80, so that the distal end of the screw 84 is pressed against a circumferential surface 83a of the collar 83. This fixes the position of the ball bearing 82 in the axial direction. However, according to this method, in addition to the fact that the position of the ball bearing 82 is fixed by the collar 83, the screw 84 fixing the collar 83 is fastened to the threaded hole 80b in a direction different from the axial direction of the shaft 81 (from above in FIG. 9). In this case, the ball bearing 82 is not completely fixed to the post 80, and a small gap is likely to form between the ball bearing 82 and the post 80 as the drum pedal is operated. This may cause deviations in the rotational axis of the shaft 81 and thus create noise while the drum is being played.

In the case of the bearing structure disclosed in U.S. Pat. No. 6,504,088, the screws 96 are threaded to the threaded holes 90b to fix the caps 91 to the posts 90, thereby fixing the position of each bearing 94 in the axial direction. However, as in the structure disclosed in Patent Document 1, the screws 96 for fixing the caps 91 are fastened to the threaded holes 90b along a direction different from the axial direction of the shaft 93. Further, according to Patent Document 2, the fastening force of the screws 96 is likely to act on the bearings 94 along the radial direction of the bearings 94. This may hinder the movement of the balls in the bearings 94, and the pedal cannot be operated smoothly.

SUMMARY OF THE INVENTION

Accordingly, it is an objective of the present invention to provide a bearing structure for a drum pedal that fixes the positions of bearings without hindering the operation of the bearings.

To achieve the foregoing and in accordance with one aspect of the present invention, a bearing structure for a drum pedal is provided. The bearing structure includes a base having a pair of posts, a shaft rotatably supported at upper ends of the pair of posts with bearings, a beater fixed to the shaft, a footboard rotatably supported to the base, and a coupling member coupling the shaft and a free end of the footboard to each other. Force pressing down on the footboard is transmitted to the shaft through the coupling member, so that the beater is rotated with the shaft and strikes the drum. At least one of the bearings is fixed to an end portion of the shaft with a fixing member along the axial direction of the shaft, and the bearing is sandwiched by the corresponding post along the axial direction, so as to be fixed to the upper end of the post.

DETAILED DESCRIPTION OF THE PREFERRED EMBODIMENTS

First Embodiment

A bearing structure for a drum pedal according to a first embodiment of the present invention will now be described with reference to FIGS. 1 to 4.

Figure 1:
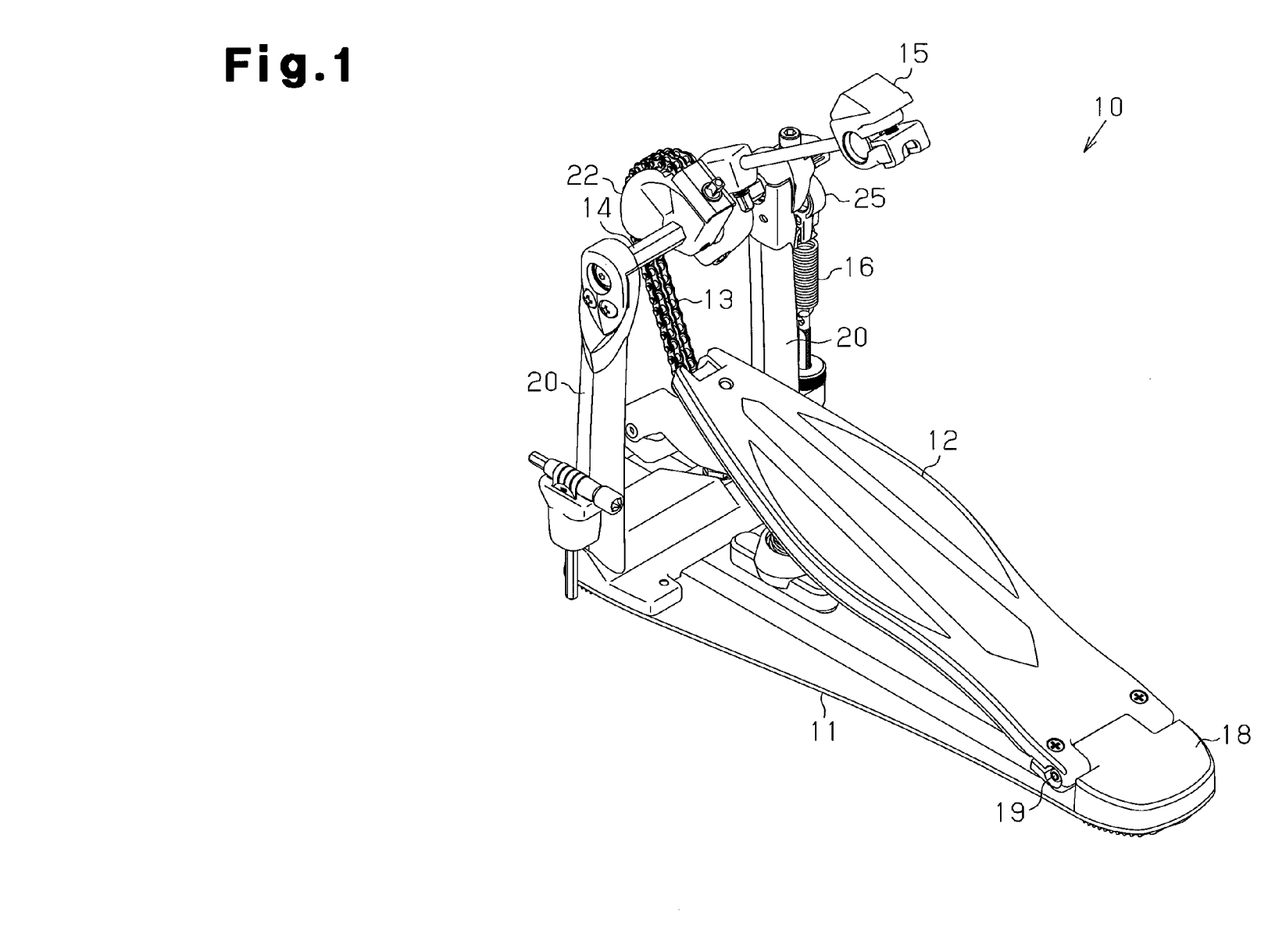
FIG. 1 is a perspective view illustrating a drum pedal incorporating a bearing structure according to a first embodiment of the present invention.
Figure 2:
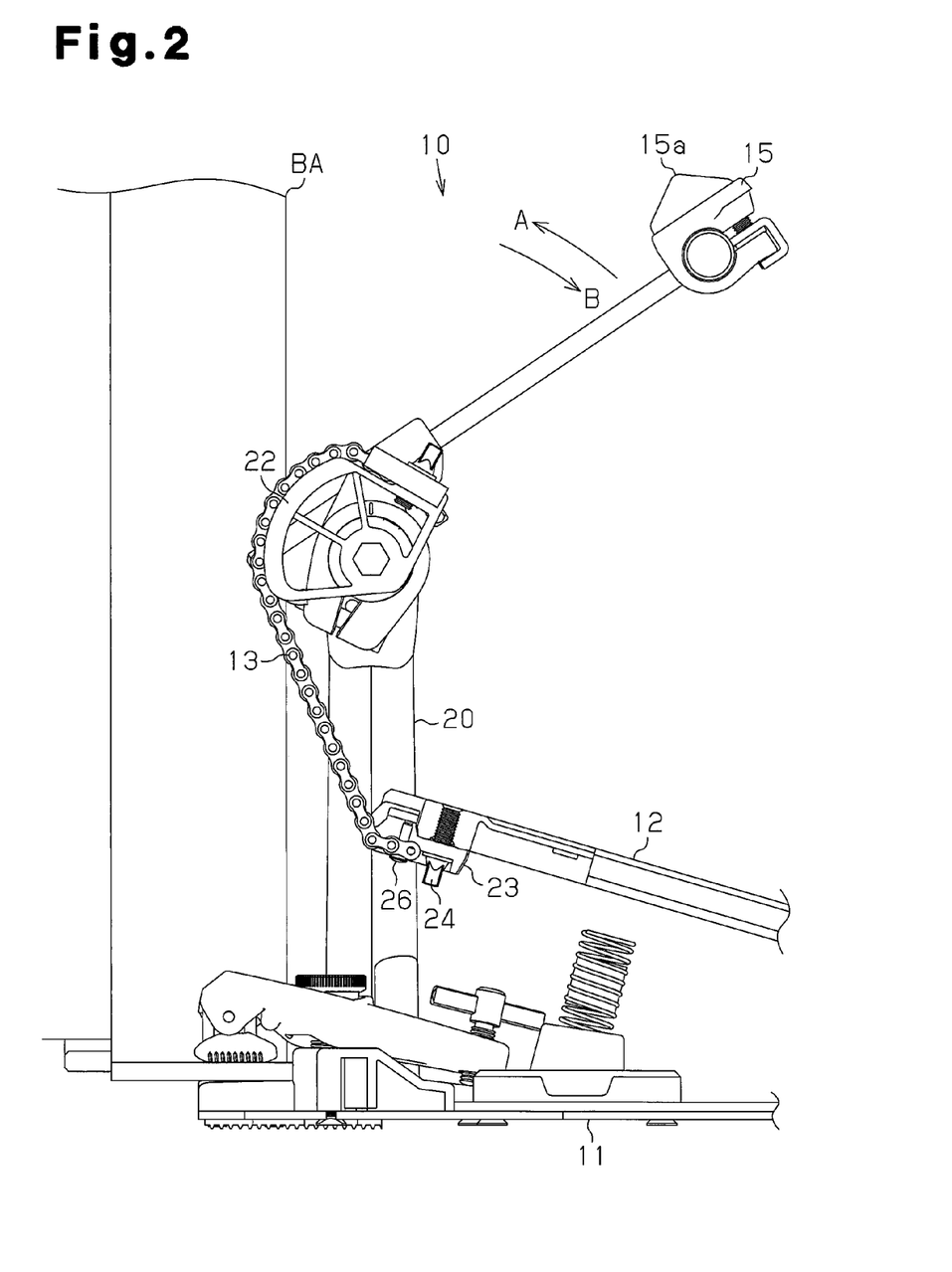
FIG. 2 is a partial side view illustrating the drum pedal connected to a bass drum.

As shown in FIGS. 1 and 2, a drum pedal 10 includes a base 11, a footboard 12, a chain belt 13 serving as a coupling member, a shaft 14, a beater 15, and a tension coil spring 16. A heel section 18 is attached to a rear end of the base 11. A rear end of the footboard 12 is rotatably attached to the heel section 18 with a support shaft 19. A pair of posts 20 is provided at the front end of the base 11 while being spaced apart from each other by a predetermined distance. A shaft 14 is rotatably supported by the upper ends of the posts 20 such that the axis of the shaft 14 extends horizontally. A beater 15 and a wheel 22 are attached to substantially the central axis of the shaft 14.

One end of the chain belt 13 is fixed to the wheel 22 while being wrapped around the circumferential surface of the wheel 22. The other end of the chain belt 13 is fixed to the front end, or a free end, of the footboard 12. Specifically, the other end of the chain belt 13 is fixed to a fixing bracket 23 from below with a screw 26. The fixing bracket 23 is fixed to the lower surface of the footboard 12 from below with a bolt 24. The chain belt 13 is supported while being pulled downward by the weight of the footboard 12 through the wheel 22 and the footboard 12. The chain belt 13 is provided in a tensioned state between the wheel 22 and the distal end of the footboard 12 and extends obliquely in relation to the base 11.

Figure 4:
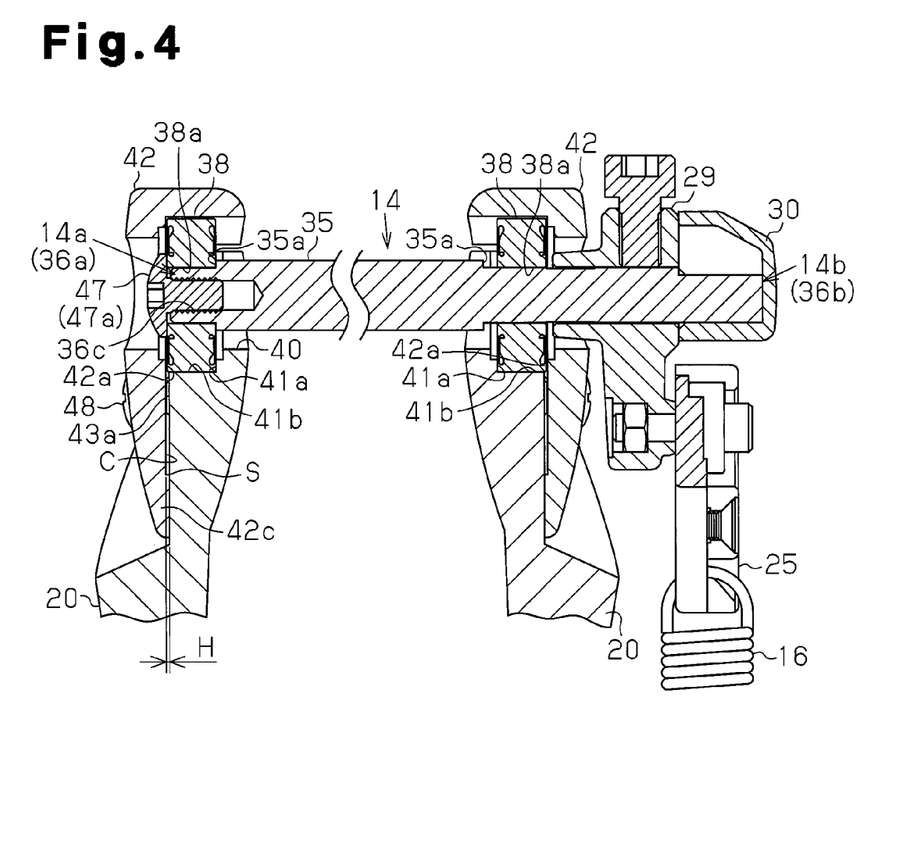
FIG. 4 is a partial cross-sectional view illustrating the bearing structure for a drum pedal.

The upper end of the tension coil spring 16 is coupled to an end of the shaft 14 by means of parts such as a ring 25 (see FIG. 4). The lower end of the tension coil spring 16 is coupled to a side portion of the base 11 that is close to the lower end of the corresponding post 20. The tension coil spring 16 is provided in a tensioned state along the axis of the post 20 by means of the ring 25 and the base 11. In this state, the tension coil spring 16 elastically holds the beater 15 at a rest position shown in FIG. 2 and the footboard 12 at a standby position shown in the same drawing.

The drum pedal 10 is arranged such that the striking face 15a of the beater 15 faces a bass dram BA, and that the base 11 is coupled to the bass drum BA. When a player presses the footboard 12 using a foot down, the drum pedal 10 transmits the pressing force to the wheel 22 through the chain belt 13. Accordingly, the beater 15 is rotated in an A direction shown in FIG. 2 together with the shaft 14. When the player stops pressing down the footboard 12, the urging force of the tension coil spring 16 rotates the beater 15 in a B direction shown in FIG. 2 together with the shaft 14. That is, the drum pedal 10 is configured such that the beater 15 reciprocates together with the shaft 14 when the footboard 12 is moved up and down using one's foot.

Figure 3:
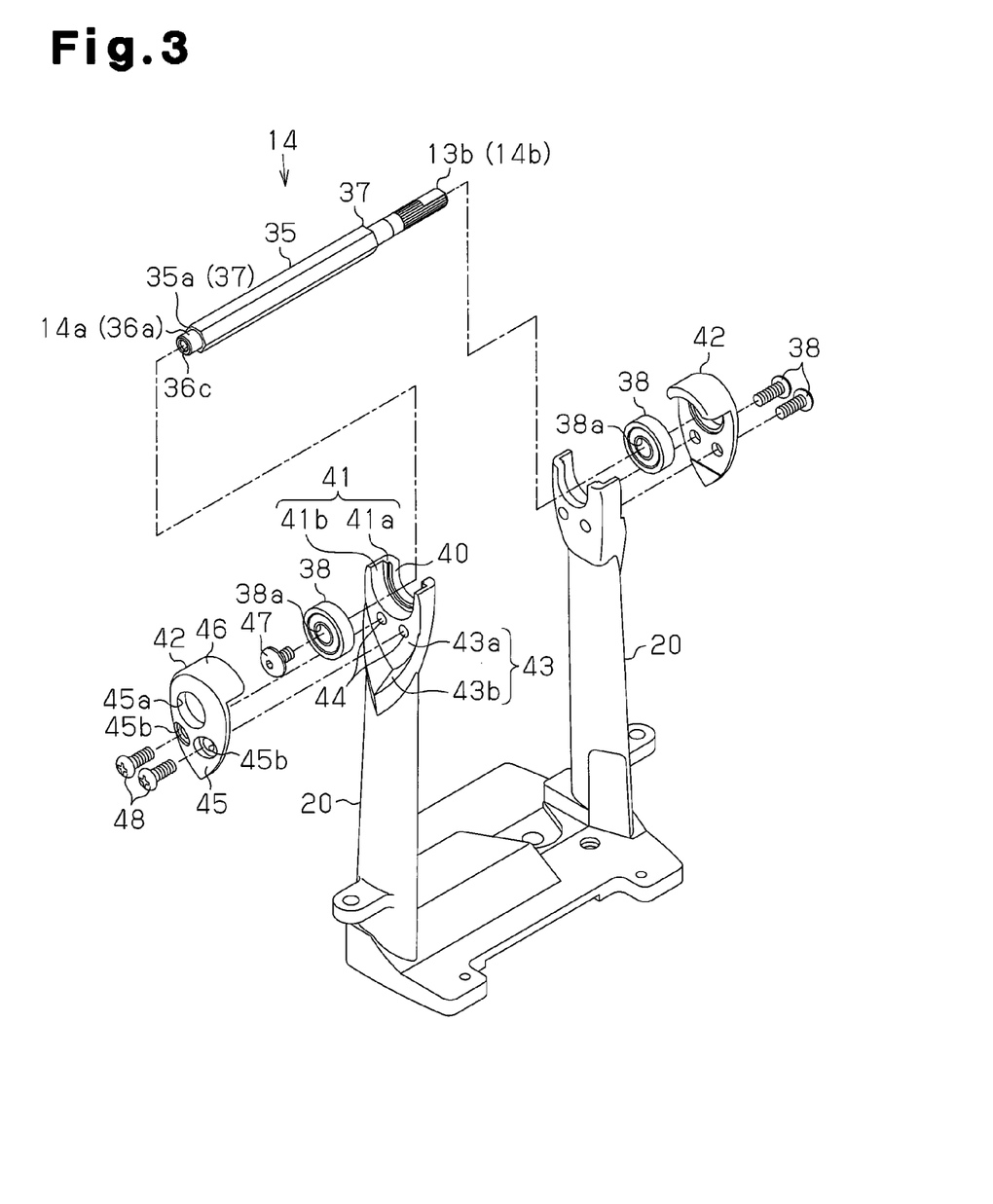
FIG. 3 is an exploded perspective view illustrating the bearing structure for a drum pedal.

The drum pedal 10 has a bearing structure shown in FIGS. 3 and 4 to rotatably support the shaft 14. In the following description of the bearing structure, the end of the shaft 14 that is supported by the left post 20 as viewed in FIG. 4 is referred to as the first end portion 14a of the shaft 14, and the end of the shaft 14 that is supported by the right post 20 as viewed in FIG. 4 is referred to as the second end portion 14b.

As shown in FIGS. 3 and 4, the shaft 14 includes a shaft main body 35 and a pair of inserted portions 36a, 36b extending from both ends of the shaft main body 35 in the axial direction. The first inserted portion 36a forms the first end portion 14a of the shaft 14. The second inserted portion 36b forms the second end portion 14b of the shaft 14. The shaft main body 35 has a regular hexagonal cross section. The first and second inserted portions 36a, 36b have a circular cross section the diameter of which is less than that of the shaft main body 35. Therefore, steps 37 are formed at end faces 35a of the shaft main body 35, that is, at the boundaries between the shaft main body 35 and the inserted portions 36a, 36b. A threaded hole 36c is formed in the first inserted portion 36a. The axis of the threaded hole 36c coincides with the axis of the shaft 14.

The shaft 14 is rotatably supported at the upper ends of the posts 20 with a pair of bearings 38. One of the bearings 38 is attached to the first inserted portion 36a. In contrast, not only the other bearing 38, but also a part 29 for transmitting the urging force of the tension coil spring 16 to the shaft 14, and a cap 30 for covering the end of the shaft 14 are attached to the second inserted portion 36b. Therefore, the second inserted portion 36b is longer than the first inserted portion 36a.

In the present embodiment, the bearings 38 are ball bearings. A ball bearing includes a metal outer race, a metal inner race arranged inside the outer race, and a plurality of balls rotatably supported between the outer and inner races. The outer race of each bearing 38 is fixed to the corresponding post 20, and the inner race rotates with the shaft 14. The bearings 38 each have a center hole 38a into which the inserted portion 36a or 36b of the shaft 14 is inserted.

One of the bearings 38 is fixed to the first end portion 14a of the shaft 14 with a screw 47 along the axial direction of the shaft 14. The bearing 38 is fixed with an end face of the inner race contacting the end face 35a of the shaft main body 35. That is, the bearing 38 is sandwiched between the end face 35a of the shaft main body 35 and the head 47a of the screw 47 at the first end portion 14a of the shaft 14. The other bearing 38 is attached to the second end portion 14b of the shaft 14 with an end face about the center hole 38a separated from the end face 35a of the shaft main body 35. This bearing 38 is supported by, but not fixed to, the second end portion 14b of the shaft 14.

Each post 20 has at the upper end an insertion portion 40 into which the shaft 14 is inserted, a support recess 41 for supporting the bearing 38, and an attachment recess 43 to which a cover 42 is attached. The cover 42 will be discussed below. The insertion portion 40 is a semicircular hole the diameter of which is larger than that of the shaft main body 35. The support recess 41 is a semicircular groove having a diameter that is substantially equal to that of the bearing 38. The support recess 41 and the insertion portion 40 are formed to be coaxial. The support recess 41 is formed by a side surface 41a adjacent to the insertion portion 40 and a bottom surface 41b adjacent to the side surface 41a. The end face of the bearing 38 is supported by the side surface 41a of the support recess 41, and the circumferential surface of the bearing 38 is supported by the bottom surface 41b.

The attachment recess 43 is a substantially triangular groove the width of which narrows from the upper end of the post 20 toward the lower end. The attachment recess 43 is formed by a side surface 43a adjacent to the bottom surface 41b of the support recess 41 and an inclined surface 43b adjacent to the side surface 43a. In the present embodiment, the side surface 43a of the attachment recess 43 corresponds to the upper side surface of the post 20. A pair of horizontally extending threaded holes 44 is formed in the side surface 43a of the attachment recess 43. The threaded holes 44 are located below the insertion portion 40 and the support recess 41.

A cover 42 for covering the end of the shaft 14 is attached to the upper end of each post 20. Each cover 42 includes a cover main body 45 and a covering portion 46. The cover main body 45 has substantially the same shape as the attachment recess 43 of the post 20. The covering portion 46 extends horizontally from the upper end of the cover main body 45. The cover main body 45 has an insertion hole 45a into which the first end portion 14a of the shaft 14 is inserted and a pair of through holes 45b located below the insertion hole 45a. The insertion hole 45a is formed to be coaxial with the insertion portion 40 and the support recess 41 of the post 20, that is, with the shaft 14 in the insertion portion 40 and the bearing 38 in the support recess 41.

A back side 42a of the cover 42, that is, a surface of the cover main body 45 that faces the bearing 38, is flat. A thick portion 42c is formed in a lower part of the cover main body 45. Therefore, a step S is formed on the back side 42a of the cover 42, at the boundary between the thick portion 42c and the remaining part. The thick portion 42c is held in surface contact with the side surface 43a of the attachment recess 43, which is a flat surface. The height H of the step S is set equal to the protruding amount of the bearing 38 projecting from the side surface 43a of the attachment recess 43 in the axial direction of the shaft 14. The cover 42 is fixed to the upper end of the post 20 by fastening two screws 48, which are inserted into the through holes 45b of the cover main body 45, to the threaded holes 44.

By fixing the cover 42 to the upper end of the post 20, the fastening force of the screws 48 acts on the outer race of the bearing 38 through the cover 42. Since the fastening force of the screws 48 acts along the axial direction of the shaft 14, the bearing 38 is pressed against the side surface 41a of the support recess 41 by the back side 42a of the cover 42. At this time, one of the two end faces of the bearing 38 is supported by the back side 42a of the cover 42, and the other end face is supported by the side surface 41a of the post 20 (the support recess 41). In this manner, the bearing 38 is sandwiched by the cover 42 and the post 20 along the axial direction of the shaft 14. In this state, the back side 42a of the cover 42 supports the outer race of the bearing 38 over the entire circumference. The side surface 41a of the post 20 only supports a part of the outer race of the bearing 38, which is supported by the support recess 41. That is, only a part of the bearing 38 that is below the shaft 14 is sandwiched by the post 20 and the cover 42.

With the cover 42 fixed to the upper end of the post 20, a clearance C is formed between a first contact part of the bearing 38 and the cover 42 and a second contact part of the post 20 and the cover 42. The clearance C has a constant width from the first contact part to the second contact part. That is, in a region where the clearance C exists, the side surface 43a of the attachment recess 43 and the back side 42a of the cover 42 are substantially parallel to each other.

The first embodiment has the following advantages.

(1) The bearing 38 fixed to the first end portion 14a of the shaft 14 is sandwiched by the cover 42 and the post 20 along the axial direction of the shaft 14. This reliably fixes the bearing 38 to the upper end of the post 20. Also, unlike the conventional structure in which a bearing is fixed by fastening screws along a direction different from the axial direction of the shaft, it is possible to eliminate force that acts in the radial direction of the bearing 38 when the screws 47 are fastened. The position of the bearing 38 in the axial direction can therefore be fixed without hindering the operation of the bearing 38.

(2) The back side 42a of the cover 42 supports the entire circumference of the outer race of the bearing 38, while the side surface 41a of the post 20 supports only a part of the outer race of the bearing 38, which is supported by the support recess 41. In this configuration, areas in which the bearing 38 contacts the post 20 and the cover 42 are limited to a narrow region below the shaft 14. This minimizes external force acting on the bearing 38. Thus, reliable operation of the bearing 38 is ensured, so that the footboard 12 can be smoothly operated.

(3) The cover 42 is fixed to the upper end of the post 20 by fastening two screws 48, which are inserted into the through holes 45b of the cover main body 45, to the threaded holes 44. The threaded holes 44 of the post 20 are located below the insertion portion 40 through which the shaft 14 is inserted. This structure reduces the size of the upper end portion of the post 20, thereby making the drum pedal compact as a whole.

(4) The step S is formed on the back side 42a of the cover 42, at the boundary between the thick portion 42c and the remaining part. The height of the step S is set equal to the protruding amount of the bearing 38 projecting from the side surface 43a of the attachment recess 43 in the axial direction of the shaft 14. Thus, between the bearing 38 and the thick portion 42c, the clearance C between the side surface 43a of the attachment recess 43 and the back side 42a of the cover 42 is maintained constant. Accordingly, the back side 42a of the cover 42 reliably presses the bearing 38 against the side surface 41a of the support recess 41. Therefore, the bearing 38 is further reliably sandwiched by the cover 42 and the post 20. Also, the force for fastening the screws 48 to fix the cover 42 to the post 20 is used effectively for sandwiching the bearing 38.

(5) While the bearing 38 fixed to the first end portion 14a of the shaft 14 is sandwiched such that the position of the bearing 38 is fixed, the bearing 38 at the second end portion 14b is not fixed. That is, the position of the bearing 38 attached to the second end portion 14b of the shaft 14 is not fixed in the axial direction. Therefore, when assembling the components for manufacturing the drum pedal 10, it is possible to absorb dimensional errors that have been created during the production of the components such as the base 11 having the posts 20, the shaft 14, and bearing 38.

(6) The chain belt 13 is provided in a tensioned state between the wheel 22 and the distal end of the footboard 12 and extends obliquely in relation to the base 11. One end of the chain belt 13 is fixed to the lower surface of the footboard 12 from below with the screw 26. Since the chain belt 13 is provided in a tensioned state and extends obliquely in relation to the base 11, the force required for pressing down the footboard 12 to hit the bass drum BA is reduced.

However, in the case where the chain belt 13 extends obliquely in relation to the base 11, when the footboard 12 stops being pressed, the footboard 12 may jump up beyond the initial position, and the chain belt 13 may become substantially parallel to the footboard 12. In this state, the chain belt 13 is likely to be disengaged from the footboard 12 depending on the position or direction in which the chain belt 13 is fixed to the footboard 12. In this respect, since the chain belt 13 is fixed to the lower surface of the footboard 12 from below in the present invention, the chain belt 13 is unlikely to be disengaged from the footboard 12 even if the footboard 12 ceases to be pressed and jumps up.

Second Embodiment

A second embodiment of the present invention will now be described with reference to FIGS. 5 and 6. Like or the same reference numerals are given to those components that are like or the same as the corresponding components of the first embodiment.

Figure 5:
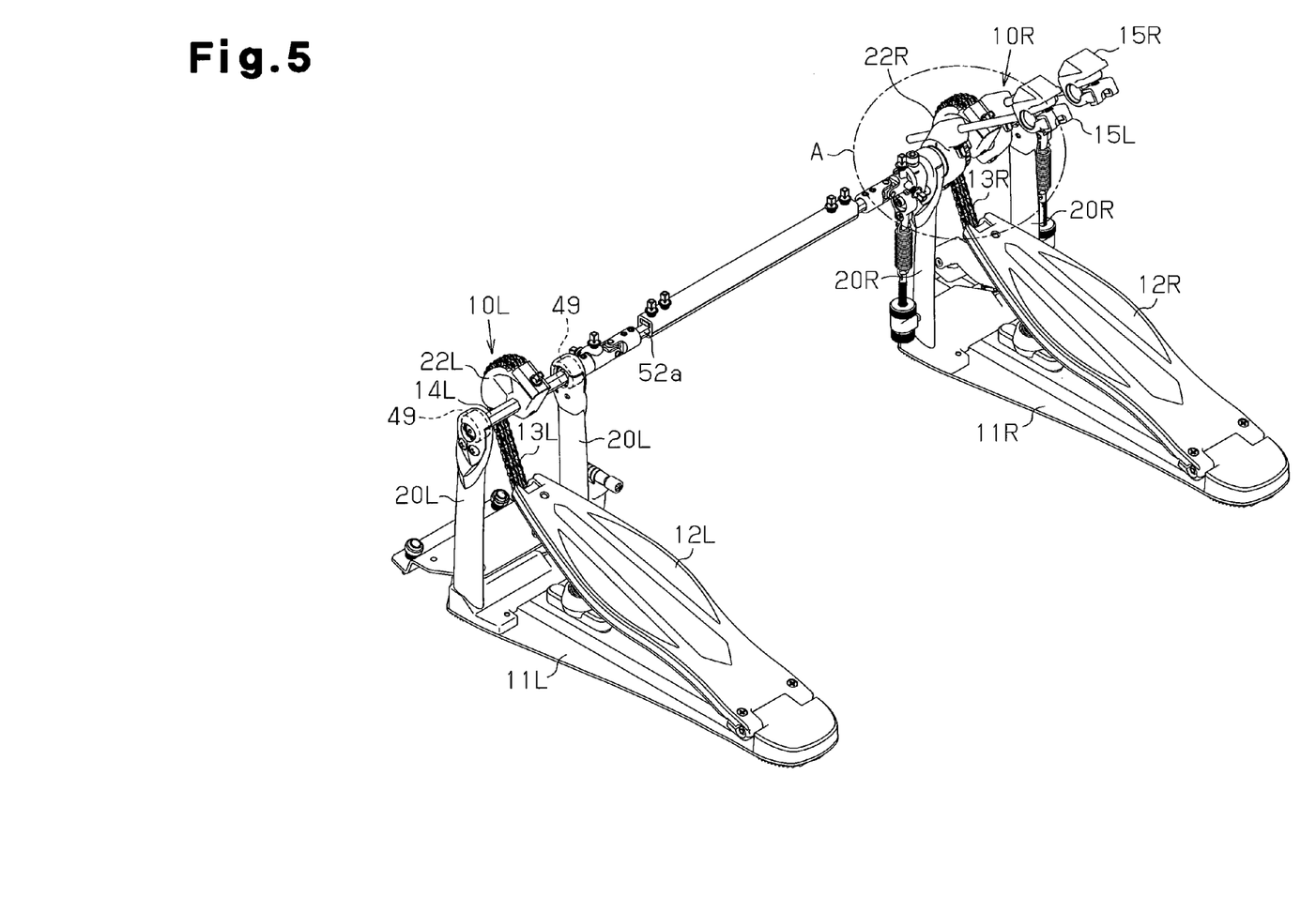
FIG. 5 is a perspective view illustrating twin pedals incorporating a bearing structure according to a second embodiment of the present invention.
Figure 6:
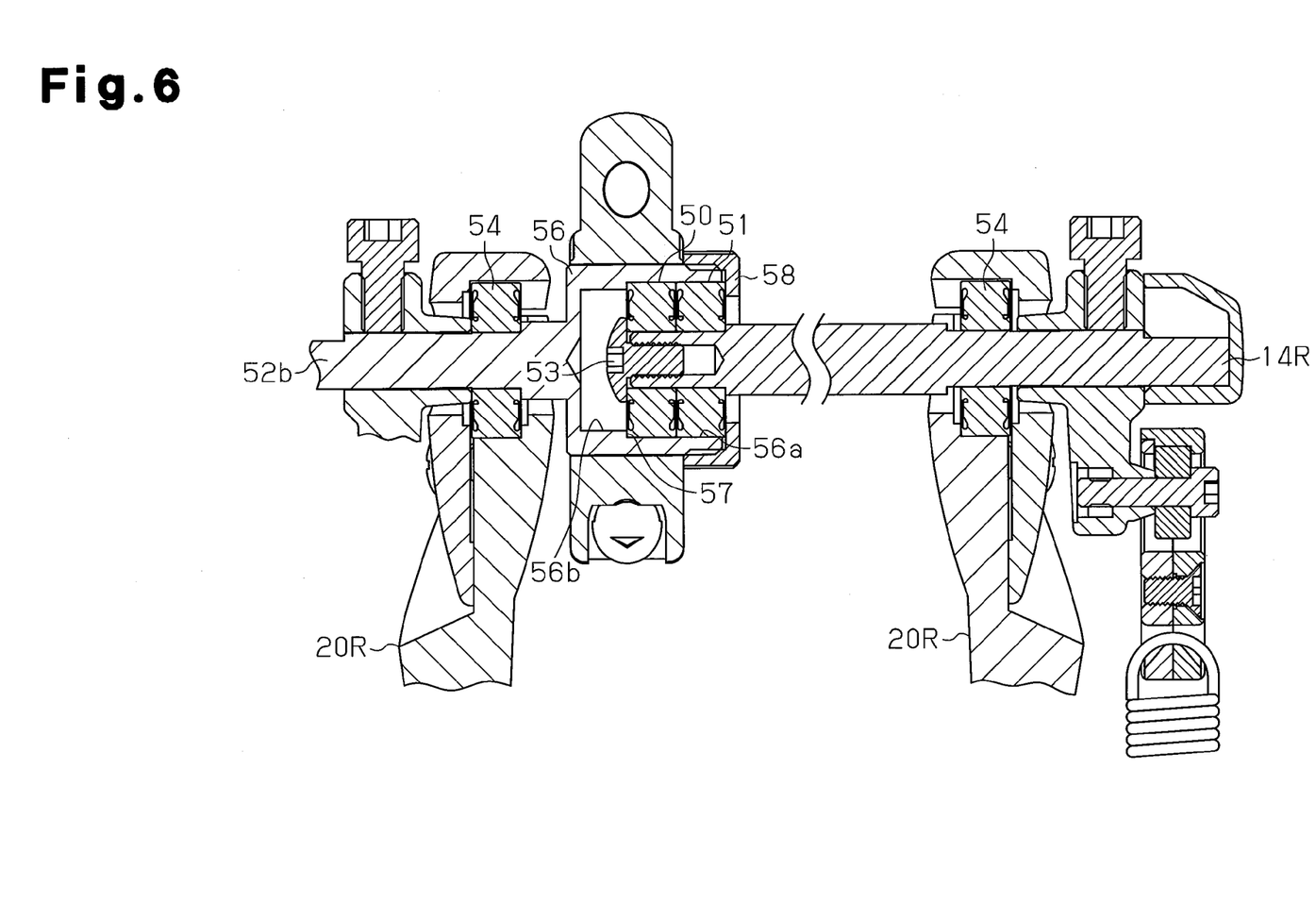
FIG. 6 is an enlarged partial cross-sectional view illustrating section A of FIG. 5.

As shown in FIGS. 5 and 6, twin pedals include a first single pedal 10L on the left and a second single pedal 10R on the right. The first single pedal 10L includes a left base 11L, a left shaft 14L, a left footboard 12L, and a left chain belt 13L. The left footboard 12L is rotatably supported at the rear end of the left base 11L.

The left chain belt 13L is coupled to the left shaft 14L via a wheel 22L, and is coupled to a free end of the left footboard 12L. A pair of posts 20L are provided at the front end of the left base 11L. The left shaft 14L is rotatably supported at the upper ends of the posts 20L with bearings 49.

A first coupler shaft 52a is provided between the first single pedal 10L and the second single pedal 10R. The first coupler shaft 52a is coupled to an end of the left shaft 14L with a universal joint. Also, an end of the first coupler shaft 52a is coupled to a second coupler shaft 52b with a universal joint. A first beater 15L is fixed to an end of the second coupler shaft 52b that is close to the second single pedal 10R.

The second single pedal 10R includes a right base 11R, a right shaft 14R, a right footboard 12R, and a right chain belt 13R. The right footboard 12R is rotatably supported at the rear end of the right base 11R. The right chain belt 13R is coupled to the right shaft 14R via a wheel 22R, and is coupled to a free end of the right footboard 12R. A pair of posts 20R is provided at the front end of the right base 11R.

The left post 20R of the second single pedal 10R rotatably supports the second coupler shaft 52b with a bearing 54. The right post 20R of the second single pedal 10R rotatably supports one end of the right shaft 14R with a bearing 54. The other end of the right shaft 14R is rotatably supported by one end of the second coupler shaft 52b with a pair of bearings 50, 51.

The bearings 50, 51 are attached to one end of the right shaft 14R, and are fixed to the right shaft 14R with a screw 53 along the axial direction of the right shaft 14R. The right shaft 14R is arranged to be substantially coaxial with the left shaft 14L, the first coupler shaft 52a, and the second coupler shaft 52b. A second beater 15R is fixed to a center in the axial direction of the right shaft 14R.

In the twin pedals, when force pressing down the left footboard 12L is transmitted to the left shaft 14L through the left chain belt 13L, the left shaft 14L is rotated. Rotation of the left shaft 14L is transmitted to the second coupler shaft 52b through the universal joint and the first coupler shaft 52a. This rotates the first beater 15L together with the second coupler shaft 52b, so that the first beater 15L strikes the bass drum. When force pressing down on the right footboard 12R is transmitted to the right shaft 14R through the right chain belt 13R, the right shaft 14R is rotated. This rotates the second beater 15R together with the right shaft 14R, so that the second beater 15R strikes the bass drum.

A cylindrical coupling portion 56 is formed at an end of the second coupler shaft 52b. The coupling portion 56 accommodates an end of the right shaft 14R, together with the pair of bearings 50, 51. A horizontally extending accommodation hole 56a and a bore 56b are formed in the coupling portion 56. The bore 56b is adjacent to and coaxial with the accommodation hole 56a. The accommodation hole 56a has a diameter slightly larger than that of the bearings 50, 51, and the bore 56b has a diameter smaller than that of the accommodation hole 56a. Therefore, a step 57 is formed at the boundary between the accommodation hole 56a and the bore 56b. An external thread is formed in a part of the outer circumferential surface of the coupling portion 56 that is closer to the right shaft 14R.

A nut 58 is threaded to the external thread of the coupling portion 56. Accordingly, the pair of bearings 50, 51 is sandwiched by the step 57 on the coupling portion 56 and the nut 58 along the axial direction of the second coupler shaft 52b and the right shaft 14R. In this state, an end face of the bearing 50 contacts the step 57, and an end face of the bearing 51 contacts the nut 58.

If the bearing structure of the present invention is employed in twin pedals as in the above described second embodiment, it is possible to achieve the same advantages as the case where the bearing structure is employed in a single pedal.

The illustrated embodiments may be modified as follows.

When the bearing 38 is fixed to the upper end of the post 20, not only the part below the shaft 14, but also the part above the shaft 14 or the entire circumference of the bearing 38 may contact the post 20 or the cover 42.

Figure 7:
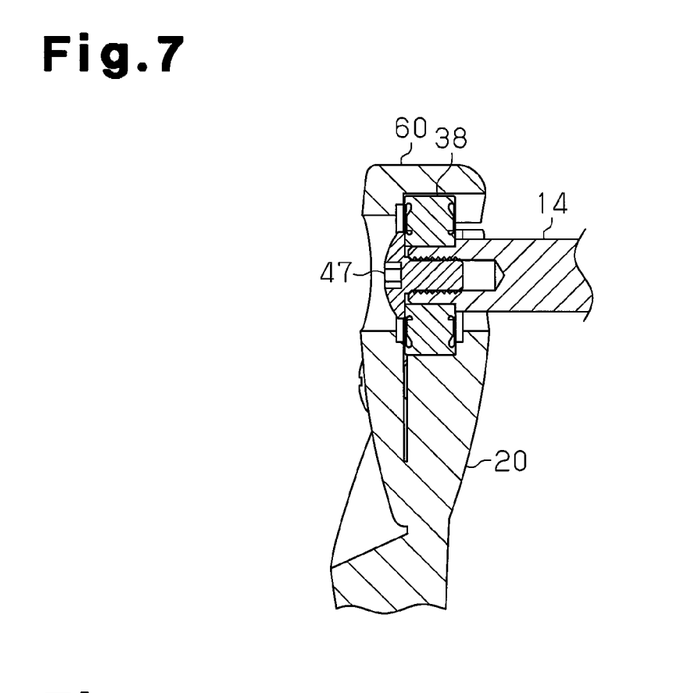
FIG. 7 is a partial cross-sectional view illustrating a bearing structure according to a modification of the present invention.

Instead of the cover 42 formed as a separate component, a cover 60 may be used that is integrally formed with the upper end of the post 20 as shown in FIG. 7.

The upper end of the post 20 may be extended to a position above the bearing 38, and a threaded hole may be formed both in a part of the post 20 above the bearing 38 and a part that is below the bearing 38. That is, the cover 42 may be fixed to the upper end of the post 20 with screws at positions above and below the bearing 38.

Figure 8:
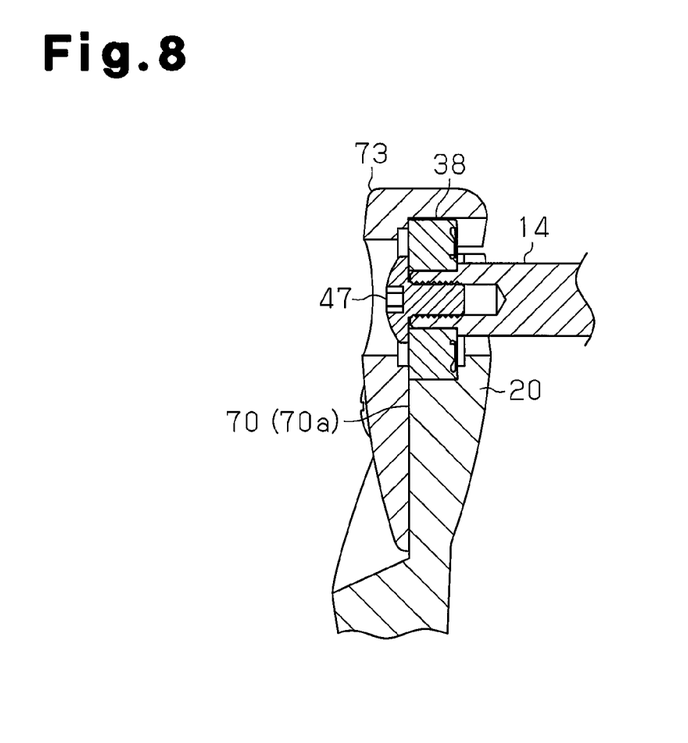
FIG. 8 is a partial cross-sectional view illustrating a bearing structure according to a modification of the present invention.

As shown in FIG. 8, an end face of the bearing 38 may be flush with the side surface 70a of the attachment recess 70, and the thick portion 42c may be omitted from the cover 73. Even in this structure, the cover 73 and the post 20 sandwich the bearing 38 along the axial direction.

In the above, one of the bearings 38 is fixed to the first end portion 14a of the shaft 14, and in contrast, the other bearing 38 is not fixed to the second end portion 14b of the shaft 14. However, the bearings 38 may be fixed to both of the first and second end portions 14a, 14b of the shaft 14.

The chain belt 13 may extend perpendicularly, not obliquely, to the base 11.

As shown in FIG. 1, the base 11 is formed as a plate. However, the base 11 may be formed by a plurality of rods connecting the heel section 18 and the posts 20.

Other than the chain belt 13, a link mechanism or a fabric belt may be used as a coupling member that couples the wheel 22 and the free end of the footboard 12.

The invention claimed is:

1. A bearing structure for a drum pedal, the bearing structure comprising:
   a base having a pair of posts;
   a shaft rotatably supported at upper ends of the pair of posts with bearings;
   a beater fixed to the shaft;
   a footboard rotatably supported to the base; and
   a coupling member coupling the shaft and a free end of the footboard to each other,
   wherein force pressing down on the footboard is transmitted to the shaft through the coupling member, so that the beater is rotated with the shaft and strikes the drum,
   wherein each of the bearings includes an outer race and an inner race arranged inside the outer race,
   wherein the posts have at the upper end a support recess for supporting the bearings
   comprising a pair of side surfaces facing each other across the bearing one surface movable axially with respect to the other,
   wherein the inner race of the bearings is fixed to an end portion of the shaft with a fixing member pressing in the axial direction of the shaft, and
   wherein the outer race of the bearing is pressingly sandwiched by the side surfaces along the axial direction urged by axially oriented fastening means.

2. The bearing structure for a drum pedal according to claim 1, wherein a cover for covering an end portion of the shaft is attached to the upper end of each post, one of both end faces of each bearing is supported by the corresponding cover, and the other end face is supported by the corresponding post.

3. The bearing structure for a drum pedal according to claim 2, wherein only a part of the fixed bearing that is below the shaft is sandwiched by the corresponding post and the cover.

4. The bearing structure for a drum pedal according to claim 2, wherein each cover is fixed to the corresponding post at a position below the corresponding bearing.

5. The bearing structure for a drum pedal according to claim 2, wherein each bearing projects along the axial direction relative to the upper side surface of the corresponding post by a predetermined amount, each cover having a thick portion in a part contacting the corresponding post, a step being formed on a back side of the cover at the boundary between the thick portion and the remaining portion, and wherein the height of the step is equal to the projecting amount of the bearing relative to the upper side surface of the post.

6. The bearing structure for a drum pedal according to claim 1, wherein the shaft has a first end portion supported by one of the pair of posts and a second end supported by the other post, and wherein one of the bearings is fixed to the first end portion, and the other bearing is not fixed to the second end portion.

7. The bearing structure for a drum pedal according to claim 1, wherein the coupling member is provided between the shaft and the footboard in a tensioned state and extends obliquely in relation to the base.

8. The bearing structure for a drum pedal according to claim 7, wherein the coupling member is fixed from below to the lower surface of the footboard.

9. The bearing structure for a drum pedal according to claim 1, wherein the drum pedal is one of first and second single pedals forming twin pedals, a coupler shaft being provided between the first and second single pedals, the coupler shaft coupling an end portion of the shaft of the first single pedal to an end portion of the shaft of the second single pedal and rotating together with the shaft of the first single pedal, wherein a cylindrical coupling portion is formed at an end of the coupler shaft, the cylindrical coupling portion accommodating the end portion of the shaft of the second single pedal together with the corresponding bearing, an external thread being formed on the outer circumferential surface of the coupling portion, and wherein a nut is fastened to the external thread of the coupling portion so that the bearing in the coupling portion is sandwiched by the coupling portion and the nut along the axial direction of the coupler shaft.

* * * * *